United States Patent
Chang

(10) Patent No.: US 8,466,899 B2
(45) Date of Patent: Jun. 18, 2013

(54) TOUCH PANEL

(75) Inventor: Yaw-Guang Chang, Tainan County (TW)

(73) Assignee: Himax Technologies Limited, Tainan (TW)

( * ) Notice: Subject to any disclaimer, the term of this patent is extended or adjusted under 35 U.S.C. 154(b) by 640 days.

(21) Appl. No.: 12/779,557

(22) Filed: May 13, 2010

(65) Prior Publication Data

US 2011/0157072 A1 Jun. 30, 2011

Related U.S. Application Data

(60) Provisional application No. 61/290,245, filed on Dec. 28, 2009.

(51) Int. Cl.
*G06F 3/041* (2006.01)
*G06F 3/045* (2006.01)
*G01R 25/00* (2006.01)
*G01R 27/00* (2006.01)

(52) U.S. Cl.
USPC .............................. 345/174; 345/173; 702/65

(58) Field of Classification Search
USPC ...................... 345/173–174; 702/65
See application file for complete search history.

(56) References Cited

U.S. PATENT DOCUMENTS

| 2010/0042346 A1* | 2/2010 | Kuang .............................. 702/65 |
| 2010/0085322 A1* | 4/2010 | Mamba et al. ................. 345/173 |
| 2010/0085324 A1* | 4/2010 | Noguchi et al. ............... 345/174 |

* cited by examiner

*Primary Examiner* — Quan-Zhen Wang
*Assistant Examiner* — Lin Li
(74) *Attorney, Agent, or Firm* — J.C. Patents

(57) ABSTRACT

A touch panel including a plurality of panel capacitors, a first switching unit, a second switching unit, a first charging unit, a control unit and a counter is provided. Each of the panel capacitors is sequentially selected as an object capacitor. The first switching unit and the second switching unit switch the voltages received by the two terminals of the object capacitor. The control unit controls a first charging current provided by the first charging unit according to the variation in the terminal voltages of the object capacitor, and generates a comparison signal accordingly. The counter counts the comparison signal and the touch panel identifies the variation in the capacitance value of the object capacitor by using a count value generated by the counter.

10 Claims, 6 Drawing Sheets

TOUCH PANEL

CROSS-REFERENCE TO RELATED APPLICATION

This application claims the priority benefit of U.S. provisional application Ser. No. 61/290,245, filed on Dec. 28, 2009. The entirety of the above-mentioned patent application is hereby incorporated by reference herein and made a part of specification.

BACKGROUND OF THE INVENTION

1. Field of the Invention

The invention relates to a touch panel, and more particularly, to a capacitive touch panel.

2. Description of Related Art

With the rapid development of technology, most electronic devices, such as notebook computers, mobile phones or portable multimedia players, usually adopt touch panels as input interfaces. Touch panels are generally categorized into capacitive touch panels and resistive touch panels. The capacitive touch panels are operated by approaching or touching the touch panels with a finger or a conductive material to change capacitances of the touch panels. When the variation in capacitance values is detected, the location approached or touched by the finger or conductive material can be identified to further execute a predetermined operation corresponding to the foregoing approached or touched location.

FIG. 1 shows a conventional touch panel and illustrates a schematic diagram of peak positions when a user touches a position A and a position B simultaneously. As shown in FIG. 1, a conventional touch panel includes a plurality of panel capacitors, for example, panel capacitors C11-C15. When the touch panel detects a touched position, panel capacitance values corresponding to the X-axis and the Y-axis are scanned by the touch panel respectively. Accordingly, when the position corresponding to the panel capacitances is touched, the panel capacitances generate corresponding capacitance change. At this time, the touched position can be positioned by intersecting the peak positions corresponding to different axes.

However, when the user touches the position A and the position B simultaneously, the position A touched and the position B touched each generate two peaks, for example, X2, X5, Y3, and Y5, at the X axis and the Y axis. At this time, the peaks on the two axes intersect to generate four intersection points, for example, A, B, A', and B'. Here, the two intersection points A' and B' that are not the actual touched positions are referred as ghost points. In this case, the touch panel detects false touched positions and causes operational error as a consequence.

SUMMARY OF THE INVENTION

The invention is directed to a touch panel capable of detecting each panel capacitor to prevent generation of ghost points.

The invention is directed to a touch panel including a plurality of panel capacitors, a first switching unit, a second switching unit, a first charging unit, a control unit, and a counter. A second terminal of each panel capacitor is electrically connected to one another. When one of the panel capacitors is selected as an object capacitor, a first terminal of each panel capacitor other than the first terminal of the object capacitor is coupled to a ground terminal. The first switching unit switches the first terminal of the object capacitor to a first voltage, a floating state, and a second voltage during a first time interval, a second time interval, and a third time interval respectively.

In addition, the second switching unit is coupled to the second terminals of the panel capacitors and conducts the same to a basic voltage during the first time interval. Moreover, the second switching unit switches the second terminals of the panel capacitors from the floating state to a signal detecting terminal during the second time interval and conducts the second terminals of the panel capacitors to the signal detecting terminal persistently during the third time interval. The first charging unit is coupled to the signal detecting terminal and refers to a charging control signal to determine whether a first charging current is to be provided during the third time interval.

On the other hand, the control unit is coupled to the signal detecting terminal and integrates a signal from the signal detecting terminal to generate an integrated voltage. The control unit compares the integrated voltage and a reference voltage to output a comparison signal and the charging control signal when the control unit is triggered. The counter counts the comparison signal to generate a count value. The touch panel identifies a variation in a capacitance value of the object capacitor by using the count value.

In one embodiment of the invention, the first switching unit includes a first switch and a second switch. A first terminal of the first switch receives the first voltage and a second terminal of the same is coupled to the first terminal of the object capacitor. A first terminal of the second switch is coupled to a second terminal of the first switch and a second terminal of the second switch receives the second voltage. Furthermore, the first switch and the second switch are controlled by a first clock signal and a second clock signal respectively to remain conductive during the first time interval and the third time interval.

In one embodiment of the invention, the control unit includes an integrator, a comparator, a latch, and an AND gate. An input terminal of the integrator is coupled to the signal detecting terminal. A first input terminal of the comparator receives the reference voltage and a second input terminal of the same is coupled to an output terminal of the integrator. An input terminal of the latch is coupled to the output terminal of the comparator and a triggering terminal of the same receives a fourth clock signal. Moreover, an output terminal of the latch provides the comparison signal. The AND gate receives the comparison signal and a fifth clock signal to generate the charging control signal. Additionally, frequencies of the fourth clock signal and the fifth clock signal are larger than frequencies of the first clock signal and the second clock signal respectively.

Accordingly, the first switching unit and the second switching unit are adopted to switch the voltages received by the two terminals of the object capacitor in the invention. In addition, the control unit captures the voltage changes at the terminals of the object capacitor to control the first charging current provided by the first charging unit. Consequently, the touch panel is capable of identifying the variation in the capacitance value of the object capacitor using the count value generated by the counter. Furthermore, when the touch panel is touched at more than two positions, the invention is capable of detecting each panel capacitor to prevent generation of ghost points.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
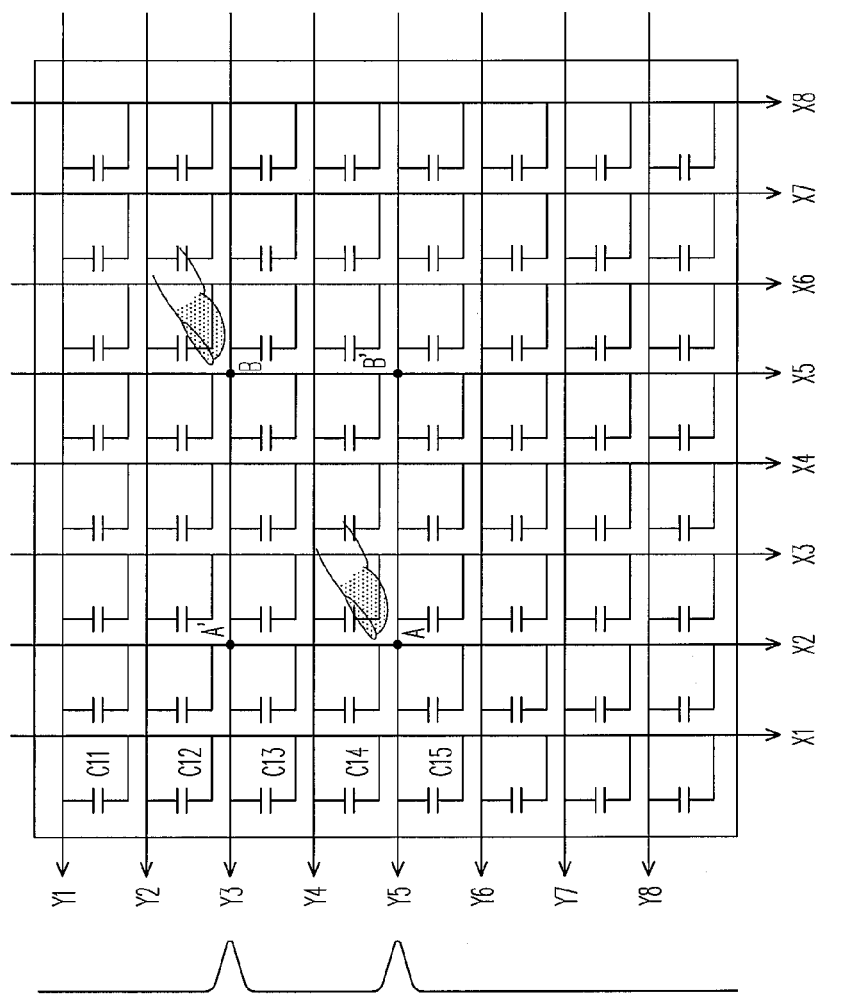
FIG. 1 depicts a conventional touch panel.
Figure 2:
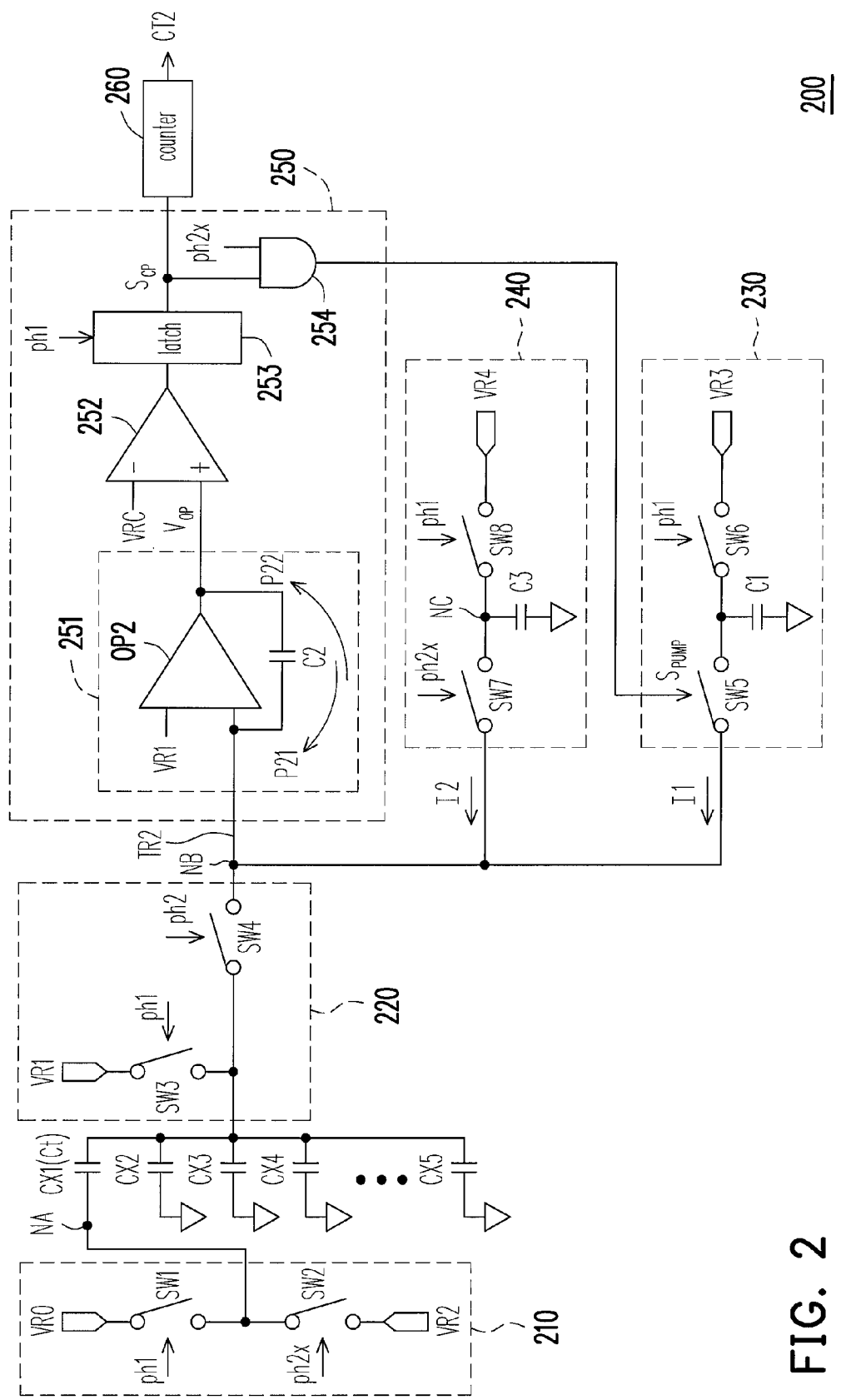
FIG. 2 is a schematic structural view of a touch panel according to an embodiment of the invention.

FIG. 2 is a schematic structural view of a touch panel according to an embodiment of the invention. As shown in FIG. 2, a touch panel 200 includes a plurality of panel capacitors, a first switching unit 210, a second switching unit 220, a first charging unit 230, a second charging unit 240, a control unit 250, and a counter 260. Here, FIG. 2 merely shows panel capacitors CX1-CX5 for illustration. Second terminals of the panel capacitors CX1-CX5 are electrically connected to one another; thus, referring to FIG. 1, the panel capacitors CX1-CX5 are coupled in a manner similar to that of panel capacitors C11-C15 in FIG. 1.

Practically, the panel capacitors CX1-CX5 are selected sequentially as an object capacitor to be detected. It should be noted that when the object capacitor has been selected, the first terminals of the panel capacitors other than the first terminal of the object capacitor are coupled to a ground terminal. For example, in FIG. 2, the panel capacitor CX1 is selected as an object capacitor Ct; thus, the first terminals of the panel capacitors CX2-CX5 are coupled to the ground terminal. Alternatively, if the panel capacitor CX2 is selected as the object capacitor Ct, then the first terminals of the panel capacitors CX1, CX3-CX5 are coupled to the ground terminal. In order to facilitate illustration, the panel capacitor CX1 is adopted as the object capacitor Ct for describing the detection of variation in the capacitance value of the object capacitor Ct.

Referring to FIG. 2, the first switching unit 210 includes a first switch SW1 and a second switch SW2. A first terminal of the first switch SW1 receives a first voltage VR0 and a second terminal of the first switch SW1 is coupled to the first terminal of the object capacitor Ct. A first terminal of the second switch SW2 is coupled to a second terminal of the first switch SW1 and a second terminal of the second switch SW2 receives a second voltage VR2. In addition, the first switch SW1 and the second switch SW2 are controlled by a first clock signal ph1 and a second clock signal ph2x respectively. Accordingly, the first terminal of the object capacitor Ct is switched to the first voltage VR0, the second voltage VR2, or a floating state through the switching of the first switch SW1 and the second switch SW2.

The second switching unit 220 includes a third switch SW3 and a fourth switch SW4. A first terminal of the third switch SW3 receives a basic voltage VR1 and a second terminal of the third switch SW3 is coupled to the second terminals of the panel capacitors CX1-CX5. A first terminal of the fourth switch SW4 is coupled to the second terminal of the third switch SW3 and a second terminal of the fourth switch SW4 is coupled to a signal detecting terminal TR2. Additionally, the third switch SW3 and the fourth switch SW4 are controlled by the first clock signal ph1 and a third clock signal ph2 respectively. Accordingly, the second terminals of the panel capacitors CX1-CX5 are switched to the basic voltage VR1, the signal detecting terminal TR2, or a floating state through the switching of the third switch SW3 and the fourth switch SW4.

The first charging unit 230 includes a fifth switch SW5, a first capacitor C1, and a sixth switch SW6. A first terminal of the fifth switch SW5 is coupled to the signal detecting terminal TR2. A first terminal of the first capacitor C1 is coupled to a second terminal of the fifth switch SW5, and a second terminal of the first capacitor C1 is coupled to the ground terminal. A first terminal of the sixth switch SW6 is coupled to the second terminal of the fifth switch SW5, and a second terminal of the sixth switch SW6 receives a third voltage VR3. Further, the fifth switch SW5 and the sixth switch SW6 are controlled by a charging control signal $S_{PUMP}$ and the first clock signal ph1 respectively. Accordingly, when the fifth switch SW5 is turned off and the sixth switch SW6 is turned on, the first capacitor C1 is charged to the third voltage VR3. Alternatively, when the fifth switch SW5 is turned on and the sixth switch SW6 is turned off, the first capacitor C1 discharges so that the first charging unit 230 provides a first charging current I1.

The second charging unit 240 includes a seventh switch SW7, a third capacitor C3, and an eighth switch SW8. Here, a first terminal of the seventh switch SW7 is coupled to the signal detecting terminal TR2. A first terminal of the third capacitor C3 is coupled to a second terminal of the seventh switch SW7, and a second terminal of the third capacitor C3 is coupled to the ground terminal. A first terminal of the eighth switch SW8 is coupled to the second terminal of the seventh switch SW7 and a second terminal of the eighth switch SW8 receives a fourth voltage VR4. Further, the seventh switch SW7 and the eighth switch SW8 are controlled by the second clock signal ph2x and a first clock signal ph1 respectively. Accordingly, when the seventh switch SW7 is turned off and the eighth switch SW8 is turned on, the third capacitor C3 is charged to the fourth voltage VR4. Alternatively, when the seventh switch SW7 is turned on and the eighth switch SW8 is turned off, the third capacitor C3 discharges so that the second charging unit 240 provides a second charging current I2.

The control unit 250 includes an integrator 251, a comparator 252, a latch 253, and an AND gate 254. An input terminal of the integrator 251 is coupled to the signal detecting terminal TR2. A first input terminal of the comparator 252 receives a reference voltage VRC and a second input terminal of the comparator 252 is coupled to an output terminal of the integrator 251. An input terminal of the latch 253 is coupled to an output terminal of the comparator 252 and a trigger terminal of the latch 253 receives the first clock signal ph1. The AND gate 254 receives a comparison signal $S_{CP}$ and the second clock signal ph2x. In the present embodiment, the integrator 251 includes an operational amplifier OP2 and a second capacitor C2. A first input terminal of the operational amplifier OP2 receives the basic voltage VR1 and a second input terminal of the operational amplifier OP2 is coupled to the signal detecting terminal TR2. Moreover, an output terminal of the operational amplifier OP2 is adopted as the output terminal of the integrator 251. A first terminal and a second terminal of the second capacitor C2 are coupled to the second input terminal and the output terminal of the operational amplifier OP2 respectively.

Figure 3:
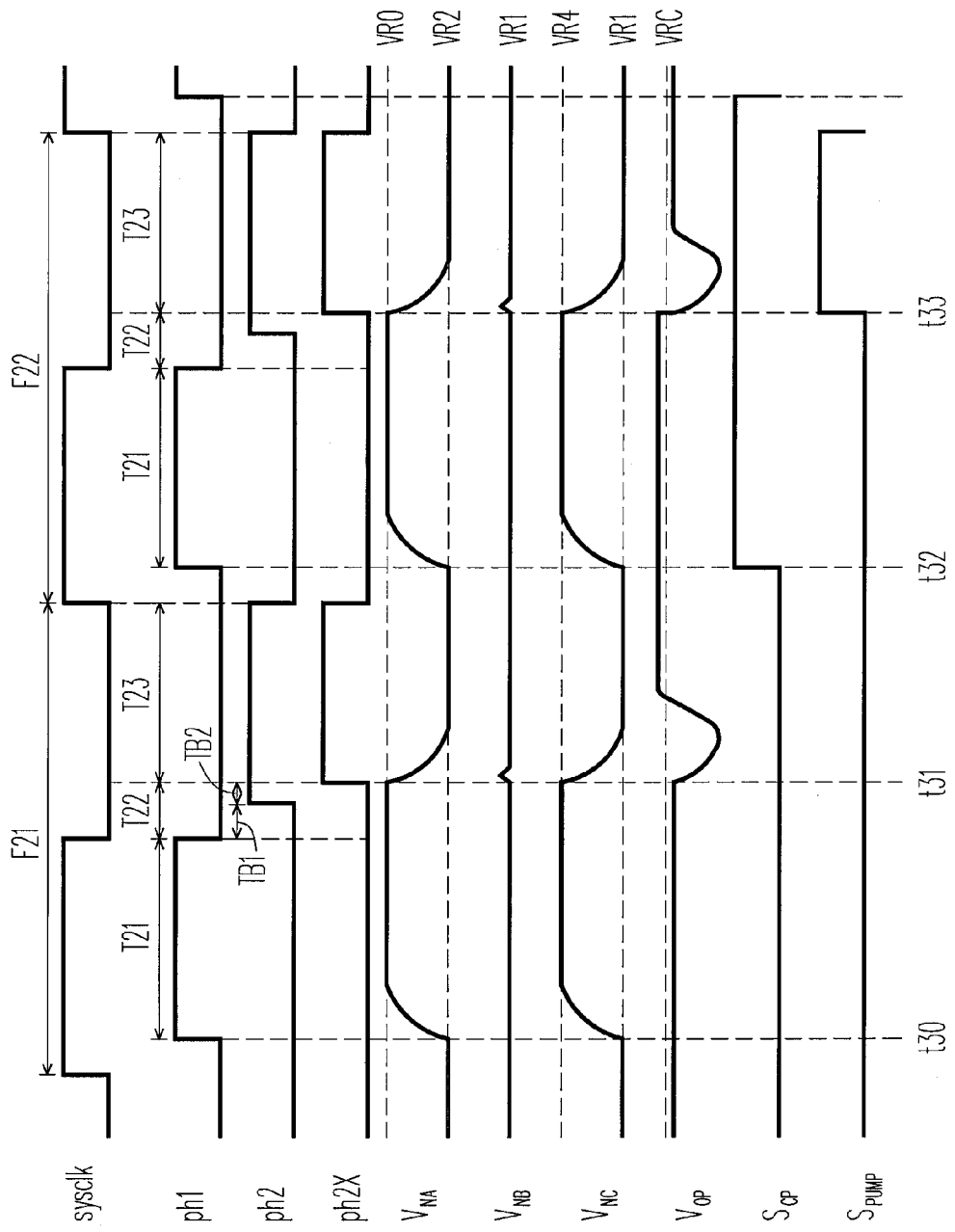
FIG. 3 is a timing waveform diagram for illustrating the touch panel in FIG. 2.

FIG. 3 is a timing waveform diagram for illustrating the touch panel in FIG. 2. Herein, $V_{NA}$-$V_{NC}$ respectively represent voltages at nodes NA-NC in FIG. 2. Referring to FIG. 2 and FIG. 3 simultaneously, the operation between the control unit 250 and the first switching unit 210, the second switching unit 220, the first charging unit 230, and the second charging unit 240 is shown. As shown in FIG. 3, system periods F21-F22 of a system clock signal sysclk each include a first time interval T21, a second time interval T22, and a third time interval T23. Regarding the first switching unit 210, since the first clock signal ph1 and the second clock signal ph2x have high level respectively during the first time interval T21 and the third time interval T23 and both have low level during the second time interval T22, the first terminal of the object capacitor Ct is switched to the first voltage VR0, the floating state, and the second voltage VR2 during the first time interval T21, the second time interval T22, and the third time interval T23 respectively.

The second terminals of the panel capacitors CX1-CX5 are conducted to the basic voltage VR1 during the first time interval T21 and are switched from the floating state to the signal detecting terminal TR2 during the second time interval T22 by controlling the second switching unit 220 through the first clock signal ph1 and the third clock signal ph2. In other wards, if the second time interval T22 is further divided into a first sub-time interval TB1 and a second sub-time interval TB2, during the first sub-time interval TB1, the second terminals of the panel capacitors CX1-CX5 are in the floating state since the first clock signal ph1 and the third clock signal ph2 both have low level. Besides, during the second sub-time interval TB2, the second terminals of the panel capacitors CX1-CX5 are conducted to the signal detecting terminal TR2 since the third clock signal ph2 is switched to high level from low level. Moreover, the second terminals of the panel capacitors CX1-CX5 are persistently conducted to the signal detecting terminal TR2 during the third time interval T23. On the other hand, as for the first charging unit 230 and the second charging unit 240, the first capacitor C1 and the third capacitor C3 are charged to the third voltage VR3 and the fourth voltage VR4 respectively during the first time interval T21 in response to the conduction of the sixth switch SW6 and the eighth switch SW8.

Additionally, in the present embodiment, the first voltage VR0 is equal to the third voltage VR3 and the fourth voltage VR4 (for example, 2 volts), the basic voltage VR1 is equal to the reference voltage VRC (for example, 1.5 volts), and the second voltage VR2 is, for example, 1 volt. In other ward, the first voltage VR0 is larger than the basic voltage VR1, and the basic voltage VR1 is larger than the second voltage VR2. Accordingly, as shown in the node voltage $V_{NA}$ in FIG. 3, the voltage at the first terminal of the object capacitor Ct is raised to the first voltage VR0 during the first time interval T21 and the second time interval T22, and the voltage at the first terminal of the object capacitor Ct is lowered to the second voltage VR2 during the third time interval T23. It should be noted that during the third time interval T23 of the system period F21, when the voltage at the first terminal of the object capacitor Ct is lowered at a time point t31 and the charging control signal $S_{PUMP}$ is maintained at low level, the feedback mechanism formed by the operational amplifier OP2 and the second capacitor C2 constitutes a current path P21 so as to retain the node voltage $V_{NB}$ at the basic voltage VR1. With the generation of the current path P21, the charge-sharing among the object capacitor Ct, the second capacitor C2, and the third capacitor C3 causes an integrated voltage $V_{OP}$ generated by the integrator 251 to raise.

Thereafter, the comparator 252 compares the integrated voltage $V_{OP}$ and the reference voltage VRC. When the integrated voltage $V_{OP}$ is larger than the reference voltage VRC in the system period F21, the comparator 252 switches the comparison signal $S_{CP}$ to high level. In addition, the latch 253 corresponds to the triggering of the first clock signal ph1 in the next system period F22, so that the control unit 250 outputs the comparison signal $S_{CP}$ at a time point t32. Furthermore, the comparison signal $S_{CP}$ multiplied with the second clock signal ph2x through the AND gate 254. Therefore, when the comparison signal $S_{CP}$ is switched to high level, the charging control signal $S_{PUMP}$ outputted by the control unit 250 is then switched to high level during the third time interval T23 for conducting the fifth switch SW5 in the first charging unit 230. Accordingly, when the voltage at the first terminal of the object capacitor Ct is lowered and the charging control signal $S_{PUMP}$ is maintained at high level at a time point t33 in the system period F22, the feedback mechanism formed by the operational amplifier OP2 and the second capacitor C2 constitutes a current path P22 so as to retain the node voltage $V_{NB}$ at the basic voltage VR1. With the generation of the current path P22, the charge-sharing among the object capacitor Ct, the second capacitor C2, the third capacitor C3, and the first capacitor C1 causes the integrated voltage $V_{OP}$ generated by the integrator 251 to lower.

Figure 4:
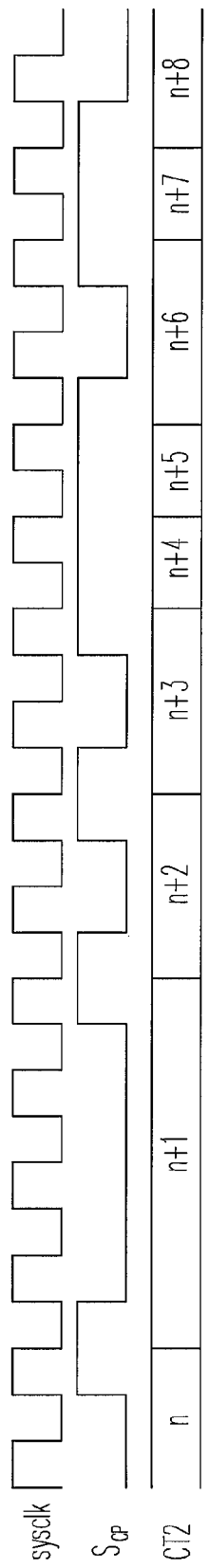
FIG. 4 illustrates another timing waveform diagram for illustrating the touch panel in FIG. 2.

On the other hand, FIG. 4 illustrates another timing waveform diagram for illustrating the touch panel in FIG. 2. As depicted in FIG. 4, the counter 260 refers to the system clock signal sysclk to count the comparison signal $S_{CP}$ for generating a count value CT2. As a consequence, the integrated voltage $V_{OP}$ is raised higher when the capacitance value of the object capacitor Ct becomes larger. At this time, the frequency of the control unit 250 switching the comparison signal $S_{CP}$ and the charging control signal $S_{PUMP}$ to high level increases relatively to lower the integrated voltage $V_{OP}$ by utilizing the first charging current I1 provided by the first charging unit 230. That is, when the capacitance value of the object capacitor Ct becomes larger, the count value CT2 generated by the counter 260 increases relatively. On the contrary, the integrated voltage $V_{OP}$ is raised to a smaller extent when the capacitance value of the object capacitor Ct becomes smaller. The frequency of the control unit 250 switching the $S_{CP}$ and the charging control signal $S_{PUMP}$ to high level decreases relatively. Thus, when the capacitance value of the object capacitor Ct becomes smaller, the count value CT2 generated by the counter 260 decreases relatively.

Consequently, the touch panel 200 applies the count value CT2 to determine the variation in capacitance values of the object capacitor Ct so as to identify the touched position on the touch panel 200. Notably, in the process of sensing the object capacitor Ct, the panel capacitors CX2-CX5 other than the object capacitor Ct do not affect the value of the comparison signal $S_{CP}$. Relatively, the value variation of the count value CT2 generated by the counter 260 only relates to the variation in the capacitance values of the object capacitor Ct. Thus, the touch panel 200 is capable of detecting each panel capacitor to prevent generation of ghost points.

Figure 5:
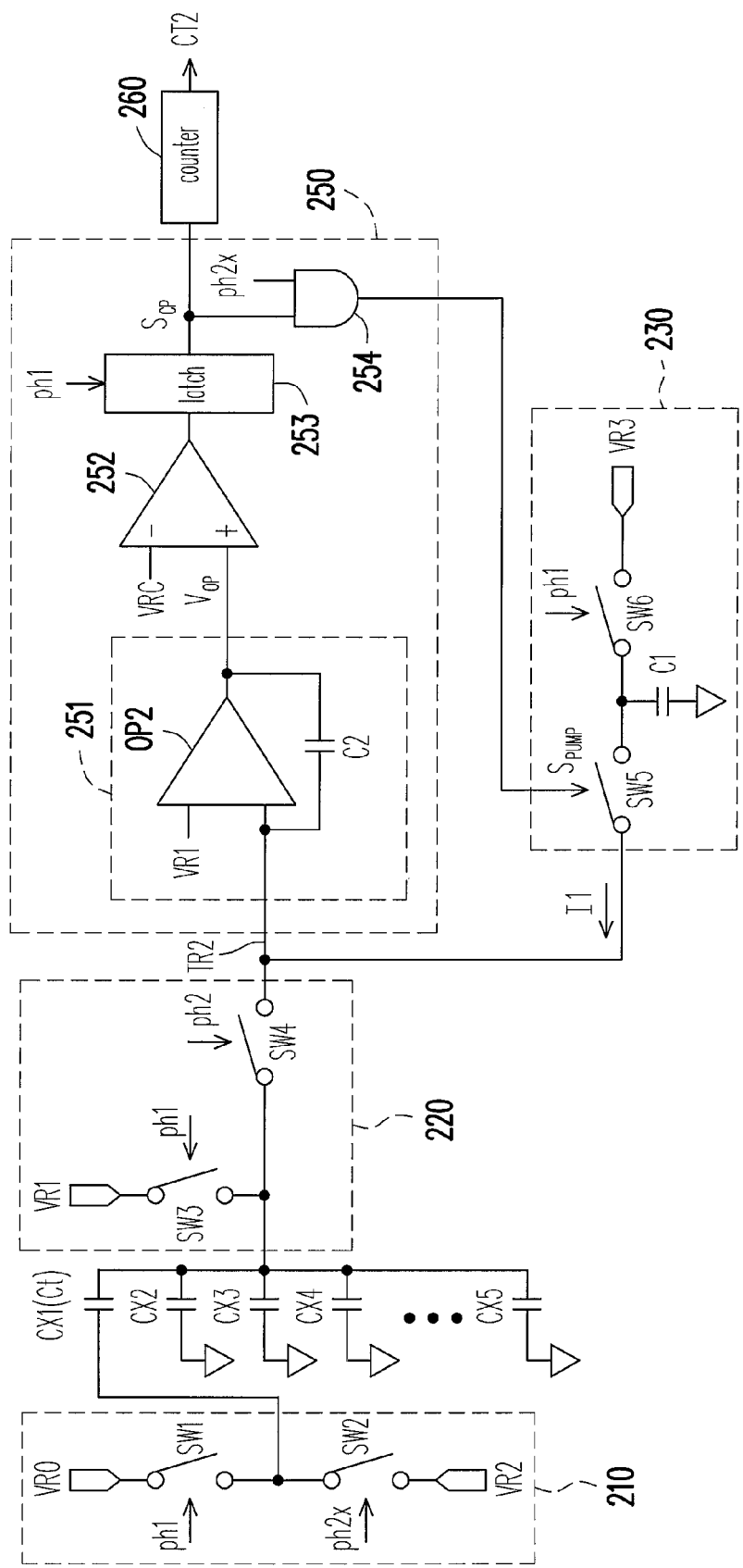
FIG. 5 is a schematic structural view of a touch panel according to another embodiment of the invention.

It should be noted that in the embodiment illustrated in FIG. 2, the second charging unit 240 is mainly used to provide compensation to the direct current level of the capacitor. Hence, persons having ordinary skills in the art can determine whether to remove the second charging unit 240 or not depending on actual needs. For example, FIG. 5 is a schematic structural view of a touch panel according to another embodiment of the invention. As depicted in FIG. 5, comparing to the embodiment described in FIG. 2, the embodiment in FIG. 5 removed the second charging unit 240 and merely used the first charging unit 230 to adjust the integrated voltage $V_{OP}$ generated by the integrator 251. The detailed operation of the embodiment in FIG. 5 is similar to that in the embodiment of FIG. 1 and thus not repeated herein.

Figure 6:
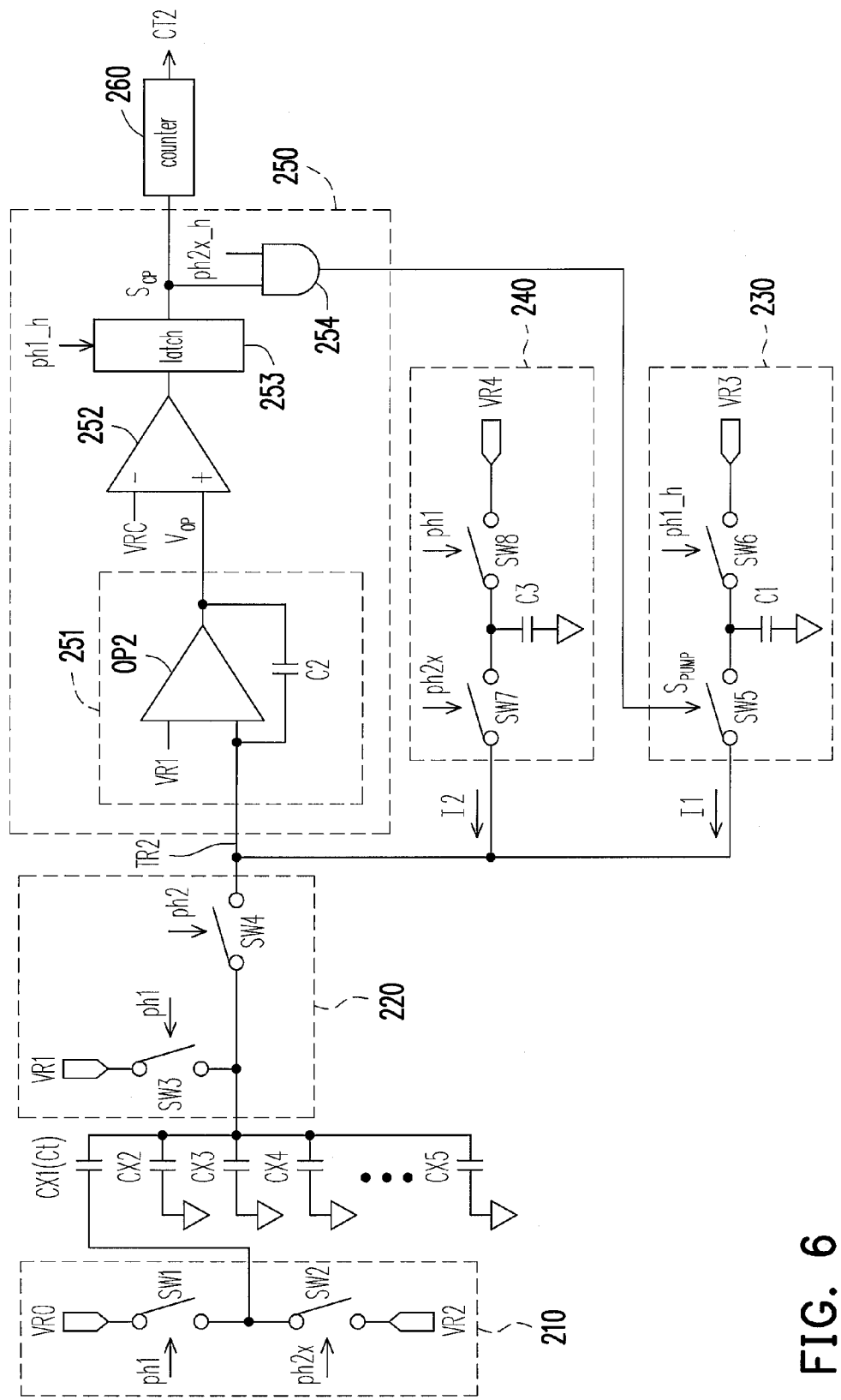
FIG. 6 is a schematic structural view of a touch panel according to another embodiment of the invention.

In the process of adjusting the integrated voltage $V_{OP}$ by the first charging unit 230, persons having ordinary skills in the art can also reduce the capacitance of the first capacitor C1 by increasing the charging frequency. For instance, FIG. 6 illustrates a schematic structural view of a touch panel according to another embodiment of the invention. Referring to FIG. 6 and FIG. 2 simultaneously, in FIG. 6, the triggering of the latch 253 is controlled using a fourth clock signal ph1_h, and a fifth clock signal ph2x_h is adopted to multiply the charging control signal $S_{CP}$. On the other hand, the first charging unit 230 controls the sixth switch SW6 using the fourth clock signal ph1_h. Additionally, frequencies of the fourth clock signal ph1_h and the fifth clock signal ph2x_h are larger than frequencies of the first clock signal ph1 and the second clock signal ph2x respectively. Thus, the first charging unit 230 is capable of providing the first charging current I1 for multiple times in every system period of the system clock signal sysclk, so as to increase the charging frequency of the second capacitor C2. The detailed operation of the embodiment in FIG. 6 is similar to that in the embodiment of FIG. 1 and thus not repeated herein.

In summary, in the invention, the first switching unit and the second switching unit are adopted to switch the voltages received by the two terminals of the object capacitor and to capture the variation in terminal voltages of the object capacitor using the control unit, thereby controlling the first charging current provided by the first charging unit. Hence, the invention is capable of detecting each panel capacitor to prevent generation of ghost points.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A touch panel, comprising:
   a plurality of panel capacitors, wherein a second terminal of each panel capacitor is electrically connected to one another and, when one of the panel capacitors is selected as an object capacitor, a first terminal of each panel capacitor other than the first terminal of the object capacitor is coupled to a ground terminal;
   a first switching unit, switching the first terminal of the object capacitor to a first voltage, a floating state, and a second voltage during a first time interval, a second time interval, and a third time interval respectively;
   a second switching unit, coupled to the second terminals of the panel capacitors, conducting the second terminals of the panel capacitors to a basic voltage during the first time interval, switching the second terminals of the panel capacitors from the floating state to a signal detecting terminal during the second time interval, and conducting the second terminals of the panel capacitors to the signal detecting terminal persistently during the third time interval;
   a first charging unit, coupled to the signal detecting terminal and referring to a charging control signal to determine whether a first charging current is to be provided during the third time interval;
   a control unit, coupled to the signal detecting terminal and integrating a signal from the signal detecting terminal to generate an integrated voltage, and comparing the integrated voltage and a reference voltage to output a comparison signal and the charging control signal when the control unit is triggered; and
   a counter, counting the comparison signal to generate a count value, wherein the touch panel identifies a variation in a capacitance value of the object capacitor by using the count value.

2. The touch panel as claimed in claim 1, wherein the first switching unit comprises:
   a first switch having a first terminal receiving the first voltage and a second terminal coupled to the first terminal of the object capacitor; and
   a second switch having a first terminal coupled to a second terminal of the first switch and a second terminal receiving the second voltage,
   wherein the first switch and the second switch are respectively controlled by a first clock signal and a second clock signal to remain conductive during the first time interval and the third time interval respectively.

3. The touch panel as claimed in claim 2, wherein the second switching unit comprises:
   a third switch having a first terminal receiving the basic voltage and a second terminal coupled to the second terminals of the panel capacitors; and
   a fourth switch having a first terminal coupled to the first terminal of the third switch and a second terminal coupled to the signal detecting terminal,
   wherein the third switch is controlled by the first clock signal to be conductive during the first time interval, and the fourth switch is controlled by a third clock signal to be switched from non-conductive to conductive during the second time interval and remains conductive during the third time interval.

4. The touch panel as claimed in claim 2, wherein the control unit comprises:
   an integrator having an input terminal coupled to the signal detecting terminal;
   a comparator having a first input terminal receiving the reference voltage and a second input terminal coupled to an output terminal of the integrator;
   a latch having an input terminal coupled to the output terminal of the comparator, a triggering terminal receiving a fourth clock signal, and an output terminal providing the comparison signal; and
   an AND gate receiving the comparison signal and a fifth clock signal to generate the charging control signal,
   wherein frequencies of the fourth clock signal and the fifth clock signal are larger than frequencies of the first clock signal and the second clock signal respectively.

5. The touch panel as claimed in claim 4, wherein the integrator comprises:
   an operational amplifier having a first input terminal receiving the basic voltage, a second input terminal coupled to the signal detecting terminal, and an output terminal adopted as the output terminal of the integrator; and
   a second capacitor having a first terminal and a second terminal coupled to the second input terminal and the output terminal of the operational amplifier respectively.

6. The touch panel as claimed in claim 2, wherein the first charging unit comprises:
   a fifth switch having a first terminal coupled to the signal detecting terminal and referring to the charging control signal to determine whether the fifth switch is switched to be conductive during the third time interval;
   a first capacitor having a first terminal coupled to a second terminal of the fifth switch and a second terminal coupled to the ground terminal; and
   a sixth switch having a first terminal coupled to the second terminal of the fifth switch and a second terminal receiving a third voltage, wherein the sixth switch is controlled by a fourth clock signal and the fourth clock signal has a frequency higher than the frequency of the first clock signal.

7. The touch panel as claimed in claim 6, wherein the third voltage is equal to the first voltage and the first voltage is larger than the second voltage.

8. The touch panel as claimed in claim 1, further comprising:
a second charging unit, coupled to the signal detecting terminal and providing a second charging current during the third time interval.

9. The touch panel as claimed in claim 8, wherein the second charging unit comprises:
a seventh switch having a first terminal coupled to the signal detecting terminal;
a third capacitor having a first terminal coupled to a second terminal of the seventh switch and a second terminal coupled to the ground terminal; and
an eighth switch having a first terminal coupled to a second terminal of the seventh switch and a second terminal receiving the fourth voltage,
wherein the seventh switch and the eighth switch are respectively controlled by a second clock signal and a first clock signal to remain conductive during the first time interval and the third time interval respectively.

10. The touch panel as claimed in claim 1, wherein the first voltage is larger than the basic voltage, and the basic voltage is larger than the second voltage.

* * * * *